(12) United States Patent
Walker et al.

(10) Patent No.: US 6,928,233 B1
(45) Date of Patent: Aug. 9, 2005

(54) SIGNAL PROCESSING METHOD AND VIDEO SIGNAL PROCESSOR FOR DETECTING AND ANALYZING A PATTERN REFLECTING THE SEMANTICS OF THE CONTENT OF A SIGNAL

(75) Inventors: Toby Walker, Kanagawa (JP); Hiroshi Matsubara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,301

(22) PCT Filed: Jan. 27, 2000

(86) PCT No.: PCT/JP00/00423

§ 371 (c)(1),
(2), (4) Date: Nov. 21, 2000

(87) PCT Pub. No.: WO00/45604

PCT Pub. Date: Aug. 3, 2000

(30) Foreign Application Priority Data

Jan. 29, 1999 (JP) .................................. 11-023064

(51) Int. Cl.[7] .......................... H04N 5/783; G06K 9/34; G06K 9/46
(52) U.S. Cl. .......................... 386/69; 386/70; 348/700; 348/701; 382/173; 382/190
(58) Field of Search ................................ 382/173, 190

(56) References Cited

U.S. PATENT DOCUMENTS

| | | | |
|---|---|---|---|
| 5,532,833 A | 7/1996 | Hong et al. | |
| 5,708,767 A * | 1/1998 | Yeo et al. | 345/440 |
| 5,751,377 A | 5/1998 | Kadono | |
| 5,790,236 A * | 8/1998 | Hershtik et al. | 352/12 |
| 5,821,945 A | 10/1998 | Yeo et al. | |
| 6,587,637 B2 * | 7/2003 | Nagasaka et al. | 386/69 |
| 6,774,917 B1 * | 8/2004 | Foote et al. | 345/700 |

FOREIGN PATENT DOCUMENTS

| | | |
|---|---|---|
| EP | 0 555 028 | 8/1993 |
| EP | 0 711 078 | 5/1996 |
| EP | 0 878 767 | 11/1998 |
| JP | 7-193748 | 7/1995 |
| JP | 8-181995 | 7/1996 |
| JP | 10-257436 | 9/1998 |

* cited by examiner

*Primary Examiner*—Thai Tran
(74) *Attorney, Agent, or Firm*—Frommer Lawrence & Haug LLP; William S. Frommer (57) ABSTRACT

The video signal processor 10 includes a scene detector 16 which uses features extracted for visual segments and/or audio segments resulted from segmentation of an input stream of video data, and a criterion for measurement of similarity between visual and/or audio segment pairs, calculated for each of the features using the similarity measurement criterion, to detect two visual segments and/or audio segments whose time gap is within a predetermined temporal threshold and whose dissimilarity is less than a predetermined dissimilarity threshold and group the segments into a scene consisting of visual segments and/or audio segments reflecting the semantics of the video data content and temporally contiguous to each other.

13 Claims, 6 Drawing Sheets

SIGNAL PROCESSING METHOD AND VIDEO SIGNAL PROCESSOR FOR DETECTING AND ANALYZING A PATTERN REFLECTING THE SEMANTICS OF THE CONTENT OF A SIGNAL

TECHNICAL FIELD

The present invention relates to a signal processing method for detecting and analyzing a pattern reflecting a semantics on which a signal is based, and a video signal processor for detecting and analyzing a visual and/or audio pattern reflecting a semantics on which a video signal is based.

BACKGROUND ART

It is often desired to search, for playback, a desired part of a video application composed of a large amount of different video data, such as a television program recorded in a video recorder, for example.

As a typical one of the image extraction techniques to extract a desired visual content, there has been proposed a story board which is a panel formed from a sequence of images defining a main scene in a video application. Namely, a story board is prepared by decomposing a video data into so-called shots and displaying representative images of the respective shots. Most of the image extraction techniques are to automatically detect and extract shots from a video data as disclosed in "G. Ahanger and T. D. C. Little: A Survey of Technologies for Parsing and Indexing Digital Video, Journal of Visual Communication and Image Representation 7: 28–4, 1996", for example.

It should be noted that a typical half-hour TV program for example contains hundreds of shots. Therefore, with the above conventional image extraction technique of G. Ahanger and T. D. C. Little, the user has to examine a story board having listed therein enormous shots having been extracted. Understanding of such a story board will be a great burden to the user. Also, a dialogue scene in which for example two persons are talking will be considered here. In the dialogue, the two persons are alternately shot by a camera each time either of them speaks. Therefore, many of such shots extracted by the conventional image extraction technique are redundant. The shots contain many useless information since they are at too low level as objects from which a video structure is to be extracted. Thus, the conventional image extraction technique cannot be said to be convenient for extraction of such shots by the user.

In addition to the above, further image extraction techniques have been proposed as disclosed in "A. Merlino, D. Morey and M. Maybury: Broadcast News Navigation Using Story Segmentation, Proceeding of ACM Multimedia 97, 1997" and the Japanese Unexamined Patent Publication No. 10-136297, for example. However, these techniques can only be used with very professional knowledge of limited genres of contents such as news and football game. These conventional image extraction techniques can assure a good result when directed for such limited genres but will be of no use for other than the limited genres. Such limitation of the techniques to special genres makes it difficult for the technique to easily prevail widely.

Further, there has been proposed a still another image extraction technique as disclosed in the U.S. Pat. No. 5,708,767 for example. It is to extract a so-called story unit. However, this conventional image extraction technique is not any completely automated one and thus a user's intervention is required to determine which shots have the same content. Also this technique needs a complicated computation for signal processing and is only applicable to video information.

Furthermore, a still another image extraction technique has been proposed as in the Japanese Unexamined Patent Publication No. 9-214879, for example, in which shots are identified by a combination of shot detection and silent period detection. However, this conventional technique can be used only when the silent period corresponds with a boundary between shots.

Moreover, a yet another image extraction technique has been proposed as disclosed in "H. Aoki, S. Shimotsuji and O. Hori: A Shot Classification Method to Select Effective Key-Frames for Video Browsing, IPSJ Human Interface SIG Notes, 7:43–50, 1996" and the Japanese Unexamined Patent Publication No. 9-93588 for example, in which repeated similar shots are detected to reduce the redundancy of the depiction in a story board. However, this conventional image extraction technique is only applicable to visual information, not to audio information.

DISCLOSURE OF THE INVENTION

Accordingly, the present invention has an object to overcome the above-mentioned drawbacks of the prior art by providing a signal processing method and video signal processor, which can extract a high-level video structure in a variety of video data.

The above object can be attained by providing a signal processing method for detecting and analyzing a pattern reflecting the semantics of the content of a signal, the method including, according to the present invention, steps of: extracting, from a segment consisting of a sequence of consecutive frames forming together the signal, at least one feature which characterizes the properties of the segment; calculating, using the extracted feature, a criterion for measurement of a similarity between a pair of segments for every extracted feature and measuring a similarity between a pair of segments according to the similarity measurement criterion; and detecting, according to the feature and similarity measurement criterion, two of the segments, whose mutual time gap is within a predetermined temporal threshold and mutual dissimilarity is less than a predetermined dissimilarity threshold, and grouping the segments into a scene consisting of a sequence of temporally consecutive segments reflecting the semantics of the signal content.

In the above signal processing method according to the present invention, similar segments in the signal are detected and grouped into a scene.

Also the above object can be attained by providing a video signal processor for detecting and analyzing a visual and/or audio pattern reflecting the semantics of the content of a supplied video signal, the apparatus including according to the present invention: means for extracting, from a visual and/or audio segment consisting of a sequence of consecutive visual and/or audio frames forming together the video signal, at least one feature which characterizes the properties of the visual and/or audio segment; means for calculating, using the extracted feature, a criterion for measurement of a similarity between a pair of visual segments and/or audio segments for every extracted feature and measuring a similarity between a pair of visual segments and/or audio segments according to the similarity measurement criterion; and means for detecting, according to the feature and similarity measurement criterion, two of the visual segments and/or audio segments, whose mutual time gap is within a predetermined temporal threshold and mutual dissimilarity is less than a predetermined dissimilarity threshold, and grouping the visual segments and/or audio segments into a scene consisting of a sequence of temporally consecutive visual segments and/or audio segments reflecting the semantics of the video signal content.

In the above video signal processor according to the present invention, similar visual segments and/or audio segments in the video signal are detected and grouped for output as a scene.

BEST MODE FOR CARRYING OUT THE INVENTION

The embodiment of the present invention will further be described below with reference to the accompanying drawings.

The embodiment of the present invention is a video signal processor in which a desired content is automatically detected and extracted from a recorded video data. Before going to the further description of the video signal processor, a video data to which the present invention is applicable will first be described.

Figure 1:
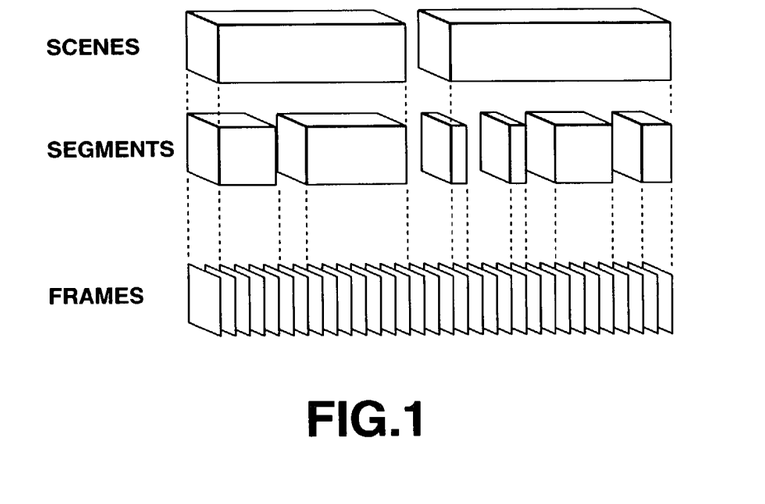
FIG. 1 explains the structure of a video data to which the present invention is applicable, using a video data model.

FIG. 1 shows a video data model having a hierarchy having three levels such as frames, segments and scenes, to which the present invention is applicable. As seen, the video data model includes a sequence of frames at the lowest level. Also the video data model includes a sequence of consecutive segments at a level one step higher than the level of the frames. Further, the video data model includes scenes at the highest level. That is, a video data is formed from the scenes each consisting of the segments grouped together based on a meaningful relation between them.

The video data includes both visual information and audio information. That is, the frames in the video data include visual frames each being a single still image, and audio frames representing audio information having generally been sampled for a time as short as tens to hundreds of milliseconds.

As in the video data model, each of segments is comprised of a sequence of visual frames having consecutively been picked up by a single camera. Generally, the segment is called "shot". The segments include visual segments and/or audio segments, and each segment is the fundamental unit of a video structure. Especially, the audio segments among these segments can be defined in many different manners as will be described below by way of example. First, audio segments are bounded by periods of silence, respectively, in a video data detected by the well-known method, as the case may be. Also, in some cases, each audio segment is formed from a sequence of audio frames classified in several categories such as speech, music, noise, silence, etc. as disclosed in "D. Kimber and L. Wilcox: Acoustic Segmentation for Audio Browsers, Xerox Parc Technical Report". Further, in other cases, the audio segments are determined based on an audio cut point which is a large variation of a certain feature from one to the other of two successive audio frames, as disclosed in "S. Pfeiffer, S. Fischer and E. Wolfgang: Automatic Audio Content Analysis, Proceeding of ACM Multimedia 96, November 1996, pp 21–30", for example.

Figure 2:
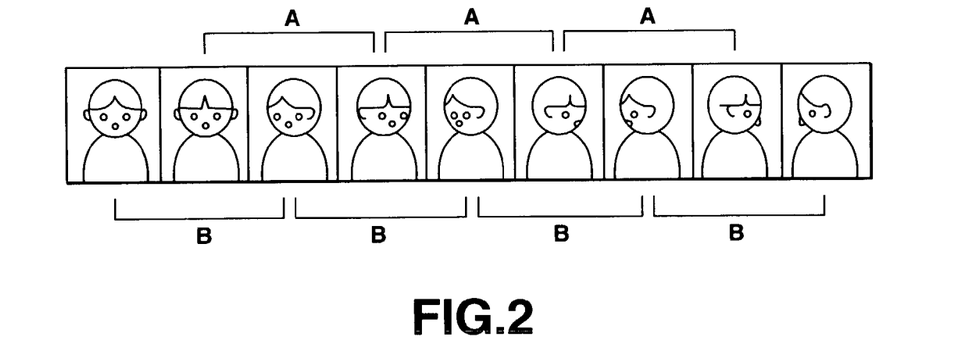
FIG. 2 explains a scene.

Further, to describe the content of a video data at a higher level based on its semantics, the scene is made up of a meaningful group of features of segments such as perceptual activities in the segments acquired by detecting visual segments or shots or audio segments. The scene is subjective and depends upon the content or genre of the video data. The scene referred to herein is a group of repeated patterns of visual or audio segments whose features are similar to each other. More specifically, in a scene of a dialogue between two persons for example, visual segments appear alternately each time one of them speaks as shown in FIG. 2. In a video data having such a repeated pattern, a sequence of visual segments A of one of the two speakers and a sequence of visual segments B of the other speaker are grouped into one scene. The repeated pattern has a close relation with a hihg-level meaningful structure in the video data, and represents a high-level meaningful block in the video data.

Figure 3:
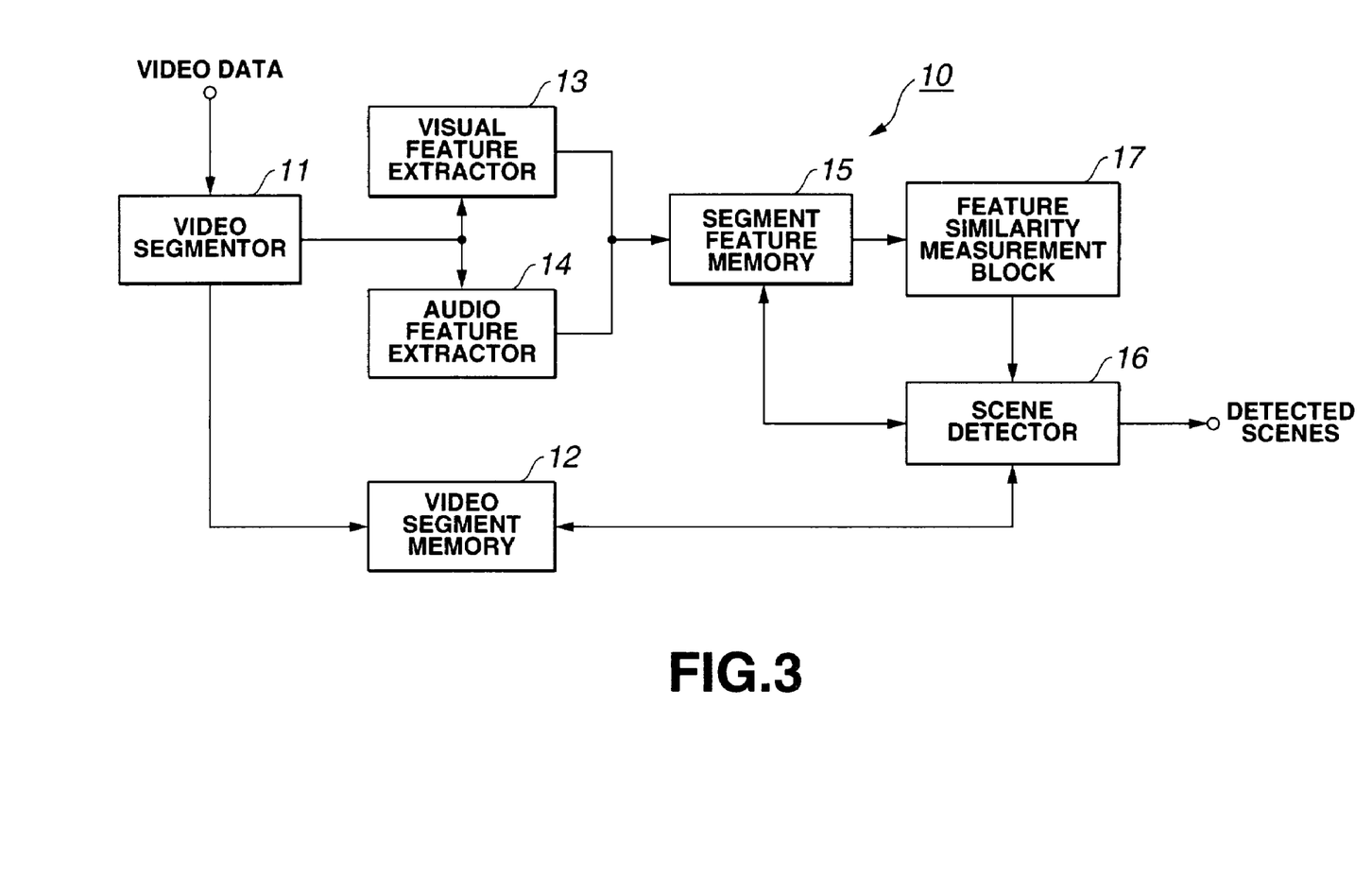
FIG. 3 is a block diagram of an embodiment of the video signal processor according to the present invention.

Referring now to FIG. 3, there is schematically illustrated the video signal processor according to the present invention. The video signal processor is generally indicated with a reference 10. In the video signal processor 10, the features of segments in the video data are used to determine the inter-segment similarity, group these segments into a scene, and automatically extract the video structure of the scene. Thus, the video signal processor 10 is applicable to both visual and audio segments.

As shown in FIG. 3, the video signal processor 10 includes a video segmentor 11 to segment or divide an input video data stream into visual or audio segments or into both, a video segment memory 12 to store the segments of the video data, a visual feature extractor 13 to extract a feature for each visual segment, an audio feature extractor 14 to extract a feature for each audio segment, a segment feature memory 15 to store the features of the visual and audio segments, a scene detector 16 in which the visual and audio segments are grouped into a scene, and a feature similarity measurement block 17 to determine a similarity between two segments.

The video segmentor 11 is supplied with a video data stream consisting of visual and audio data in any one of various digital formats including compressed video formats such as Moving Picture Experts Group Phase 1 (MPEG1), Moving Picture Experts Group Phase 2 (MPEG2) and digital video (DV), and divides the video data into visual or audio segments or into both segments. When the input video data is in a compressed format, the video segmentor 11 can directly process the compressed video data without fully expanding it. The video segmentor 11 divides the input video data into visual or audio segments or into both segments. Also, the video segmentor 11 supplies the downstream video segment memory 12 with information segments resulted from the segmentation of the input video data. Further, the video segmentor 11 supplies the information segments selectively to the downstream visual feature extractor 13 and audio feature extractor 14, depending upon whether the information is visual or audio segments.

The video segment memory 12 stores the information segments of video data supplied from the video segmentor 11. Also the video segment memory 12 supplies the information segments to the scene detector 16 upon query from the scene detector 16.

The visual feature extractor 13 extracts a feature for each visual segment resulted from segmentation of the video data by the video segmentor 11. The visual feature extractor 13 can process a compressed video data without fully expanding it. It supplies the extracted feature of each visual segment to the downstream segment feature memory 15.

The audio feature extractor 14 extracts a feature for each audio segment resulted from segmentation of the video data by the video segmentor 11. The audio feature extractor 14 can process a compressed audio data without fully expanding it. It supplies the extracted feature of each audio segment to the downstream segment feature memory 15.

The segment feature memory 15 stores the visual and audio segment features supplied from the visual and audio feature extractors 13 and 14, respectively. Upon query from the downstream feature similarity measurement block 17, the segment feature memory 15 supplies stored features and segments to the feature similarity measurement block 17.

The scene detector 16 groups the visual and audio segments into a scene using the information segments stored in the video segment memory 12 and the similarity between a pair of segments. Th scene detector 16 starts with each segment in a group to detect a repeated pattern of similar segments in a group of segments, and group such segments into the same scene. The scene detector 16 groups together segments into a certain scene, gradually enlarges the group until all the segments are grouped, and finally produces a detected scene for output. Using the feature similarity measurement block 17, the scene detector 16 determines how similar two segments are to each other.

The feature similarity measurement block 17 determines a similarity between two segments, and queries the segment feature memory 15 to retrieve the feature for a certain segment.

Figure 4:
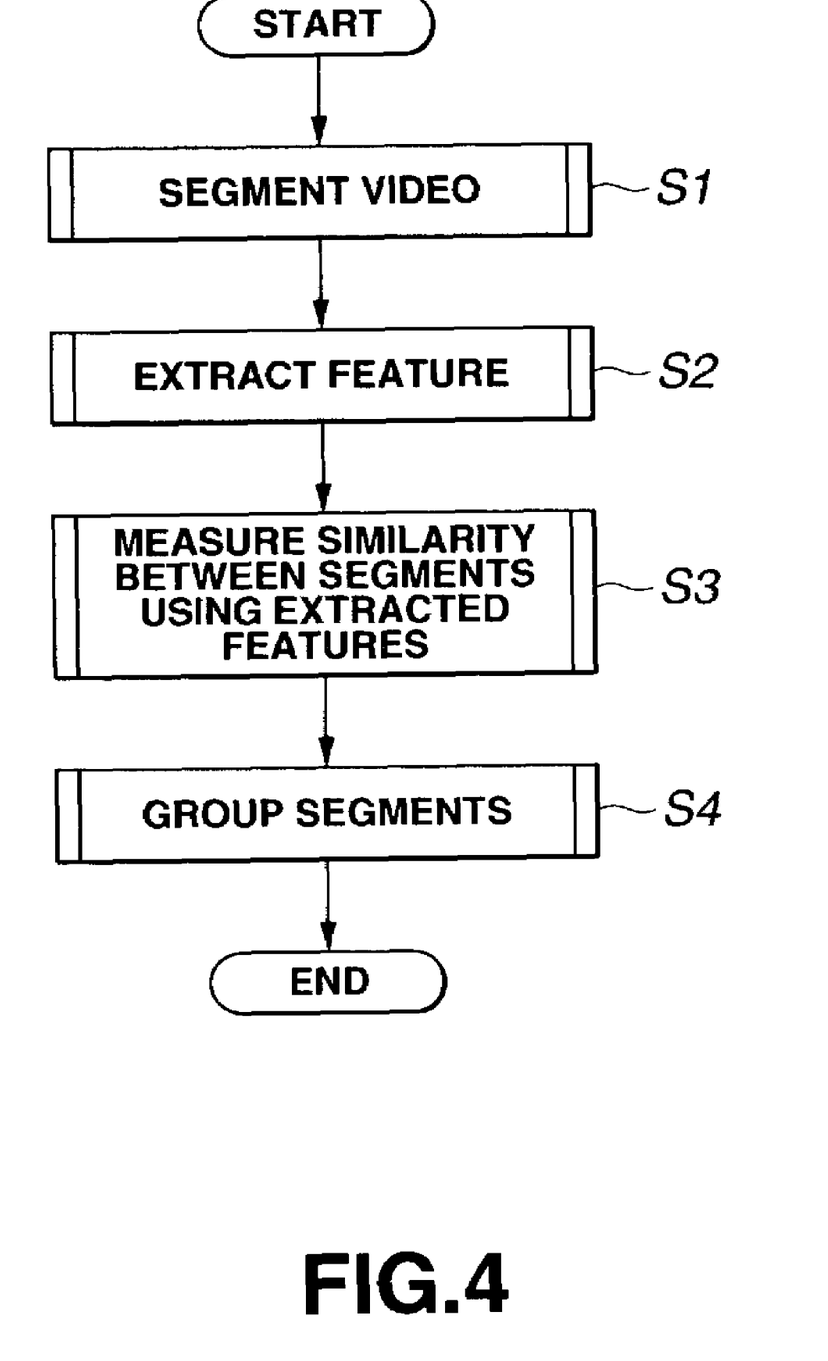
FIG. 4 is a flow chart of a series of operations effected in detecting segments and grouping them into a scene in the video signal processor.

Since repeated similar segments lying close to each other in time are generally a part of the same scene, the video signal processor 10 detects such segments and groups them to detect a scene. The video signal processor 10 detects a scene by effecting a series of operations as shown in FIG. 4.

First at step S1 in FIG. 4, the video signal processor 10 divides a video data into visual or audio segments as will be described below. The video signal processor 10 divides a video data supplied to the video segmentor 11 into visual or audio segments or possibly into both segments. The video segmenting method employed in the video signal processor 10 is not any special one. For example, the video signal processor 10 segments a video data by the method disclosed in the previously mentioned "G. Ahanger and T. D. C. Little: A Survey of Technologies for Parsing and Indexing Digital Video, Journal of Visual Communication and Image Representation 7: 28–4, 1996". This video segmenting method is well known in this field of art. The video signal processor 10 according to the present invention can employ any video segmenting method.

Next at step S2, the video signal processor 10 extracts a feature. More specifically, the video signal processor 10 calculates a feature which characterizes the properties of a segment by means of the visual feature extractor 13 and audio feature extractor 14. In the video signal processor 10, for example, a time duration of each segment, video or visual features such as color histogram and texture feature, audio features such as frequency analysis result, level and pitch, activity determination result, etc. are calculated as applicable features. Of course, the video signal processor 10 according to the present invention is not limited to these applicable features.

Next at step S3, the video signal processor 10 measures a similarity between segments using their features. More specifically, the video signal processor 10 measures a dissimilarity between segments by the feature similarity measurement block 17 and determines how similar two segments are to each other according to the feature similarity measurement criterion of the feature similarity measurement block 17. Using the features having been extracted at step S2, the video signal processor 10 calculates a criterion for measurement of dissimilarity.

At step S4, the video signal processor 10 groups the segments. More particularly, using the dissimilarity measurement criteria calculated at step S3 and features extracted at step S2, the video signal processor 10 iteratively groups similar segments lying close to each other in time. Thus, the video signal processor 10 provides a finally produced group as a detected scene.

With the above series of operations, the video signal processor 10 can detect a scene from a video data. Therefore, using the above result, the user can sum the content of the video data and quickly access to points of interest in the video data.

The operation of the video signal processor 10 at each of the steps shown in FIG. 4 will further be described below.

First the video segmentation at step S1 will be discussed herebelow. The video signal processor 10 divides a video data supplied to the video segmentor 11 into visual or audio segments or into both segments if possible. Many techniques are available for automatic detection of a boundary between segments in a video data. As mentioned above, the video signal processor 10 according to the present invention is not limited to any special video segmenting method. On the other hand, the accuracy of scene detection in the video signal processor 10 substantially depends upon the accuracy of the video segmentation which is to be done before the scene detection. It should be noted that in the video signal processor 10, the scene detection can be done even with some error in the video segmentation. In this video signal processor 10, excessive segment detection is more preferable than insufficient one for the video segmentation. Namely, so long as excessive similar segments are detected, they can be grouped as those included in the same scene.

Next the feature detection at step S2 will be discussed herebelow. The features are attributes of segments, characterizing the properties of the segments and providing information according to which a similarity between different segments is measured. In the video signal processor 10, the visual and audio feature extractors 13 and 14 calculate visual and audio features for each segment. However, the video signal processor 10 is not limited to any special features. The features considered to be effectively usable in the video signal processor 10 include visual feature, audio feature and visual-audio feature as will be described below. The requirement for these features usable in the video signal processor 10 is that they should be ones from which a dissimilarity can be determined. For a higher efficiency of signal processing, the video signal processor 10 simultaneously effects a feature extraction and video segmentation as the case may be. The features which will be described below meet the above requirement.

The features include first a one concerning an image (will be referred to as "visual feature" hereinafter). A visual segment is composed of successive visual frames. Therefore, an appropriate one of the visual segments can be extracted to characterize the content the visual segment depicts, by the extracted visual frame. Namely, a similarity of the appropriately extracted visual frame can be used as a similarity between visual segments. Thus, the visual feature is an important one of the important features usable in the video signal processor 10. The visual feature can represent by itself only static information. Using a method which will be described later, the video signal processor 10 can extract a dynamic feature of visual segments based on the visual feature.

The visual features include many well-known ones. However, since it has been found that color feature (histogram) and video correlation, which will be described below, provide a good compromise between the cost and accuracy of calculation for the scene detection, the video signal processor 10 will use the color feature and video correlation as visual features.

In the video signal processor 10, colors of images are important materials for determination of a similarity between two images. The use of a color histogram for determination of a similarity between images is well known as disclosed in, for example, "G. Ahanger and T. D. C. Little: A Survey of Technologies for Parsing and Indexing Digital Video, Journal of Visual Communication and Image Representation 7: 28–4, 1996". It should be noted that the color histogram is acquired by dividing a three-dimensional space such as HSV, RGB or the like for example into n areas and calculating a relative ratio of frequency of appearance in each area of pixels of an image. Information thus acquired gives an n-dimensional vector. Also, a color histogram can be extracted directly from a compressed video data as disclosed in the U.S. Pat. No. 5,708,767.

The video signal processor 10 uses a 64-dimensional ($=2^{2 \cdot 3}$-dimensional) histogram vector acquired by sampling, at a rate of 2 bits per color channel, an original YUV color space in images forming a segment.

Such a histogram represents a total color tone of an image but includes no timing data. For this reason, a video correlation is calculated as another visual feature in the video signal processor 10. For the scene detection in the video signal processor 10, mutual overlapping of a plurality of similar segments is an important index indicating that the segments form together a scene structure. For example, in a dialogue scene, the camera is moved between two persons alternately and to one of them being currently speaking. Usually, for shooting the same person again, the camera is moved back to nearly the same position where he or she was previously shot. Since it has been found that for detection of such a scene structure, a correlation based on reduced grayscale images is a good index for a similarity between segments, initial images are thinned and reduced to grayscale images each of M×N (both M and N may be small values; for example, M×N may be 8×8) in size and a video correlation is calculated using the reduced grayscale images in the video signal processor 10. That is, the reduced gray scale images are interpreted as an MN-dimensional feature vector.

The features different from the above-mentioned visual feature concern a sound. This feature will be referred to as "audio feature" hereinafter. The audio feature can represent the content of an audio segment. In the video signal processor 10, a frequency analysis, pitch, level, etc. may be used as audio features. These audio features are known from various documents.

First, the video signal processor 10 can make a frequency analysis of a Fourier Transform component or the like to determine the distribution of frequency information in a single audio frame. For example, the video signal processor 10 can use FFT (Fast Fourier Transform) component, frequency histogram, power spectrum and other features.

Also, the video signal processor 10 may use pitches such as a mean pitch and maximum pitch, and sound levels such as mean loudness and maximum loudness, as effective audio features for representation of audio segments.

Further features are those common to visual and audio segments. They are neither any visual feature nor audio feature, but provide useful information for representation of features of segments included in a scene. The video signal processor 10 uses a segment length and an activity, as common visual-audio features.

As in the above, the video signal processor 10 can use a segment length as a common visual-audio feature. The segment length is a time length of a segment. Generally, a scene has a rhythm feature inherent to itself. The rhythm feature appears as a change of segment length in a scene. For example, short segments contiguous to each other with a short time between them represent a commercial program. On the other hand, segments included in a conversation or dialogue scene are longer than those in a commercial program. Also, segments associated with each other in a dialogue scene are similar to each other. The video signal processor 10 can use such feature segment length as a common visual-audio feature.

Also, the video signal processor 10 can use an activity as a common visual-audio feature. The activity is an index indicating how dynamic or static the content of a segment feels. For example, if a segment visually feels dynamic, the activity indicates a rapidity with which a camera is moved along an object or with which an object being shot by the camera changes.

The activity is indirectly calculated by measuring a mean value of inter-frame dissimilarity in feature such as color histogram. A video activity VF is given by the following equation (1):

$$F = \frac{\sum_{i=b}^{f-1} d_F(i, j+1)}{f-b} \quad (1)$$

where i and j are frames, F is a feature measured between the frames i and j, $d_F(i, j)$ is a dissimilarity measurement criterion for the feature $d_F$, and b and f are numbers for a first frame and last frame in one segment.

More specifically, the video signal processor 10 can calculate the video activity $V_F$ using the above-mentioned histogram for example.

Figure 5:
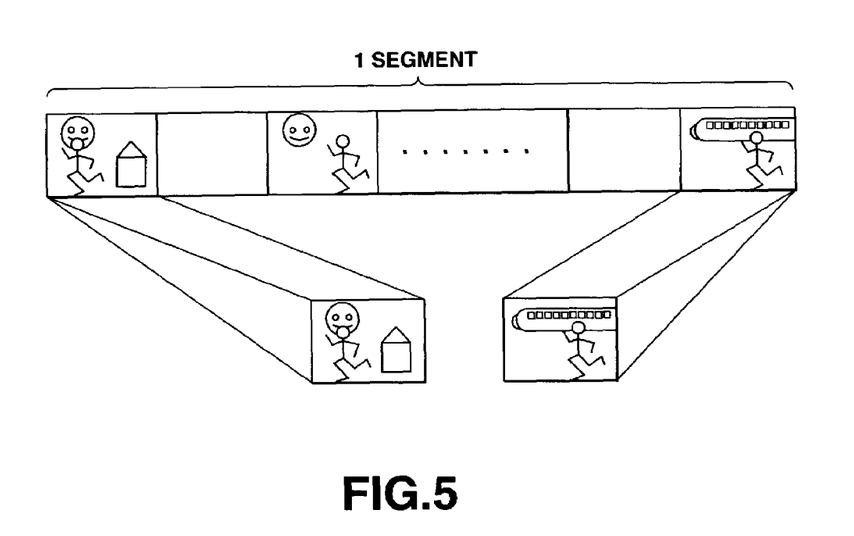
FIG. 5 explains the sampling of dynamic features in the video signal processor.

The features including the above-mentioned visual features basically indicate static information of a segment as in the above. To accurately represent the feature of a segment, however, dynamic information has to be taken in consideration. For this reason, the video signal processor 10 represents dynamic information by a feature sampling method which will be described below:

As shown in FIG. 5 for example, the video signal processor 10 extracts more than one static feature, starting at different time points in one segment. At this time, the video signal processor 10 determines the number of features to extract by keeping a balance between a highest fidelity of segment depiction and a minimum data redundancy. For example, when a certain image in the segment can be designated as a key frame in that segment, a histogram calculated from the key frame will be a feature to extract.

Using the sampling method which will be described later, the video signal processor 10 determines which of the samples extractable as feature of an object segment are to be selected.

Here, it will be considered that a certain sample is always selected at a predetermined time point, for example, at the last time point in a segment. In this case, samples from two arbitrary segments changing to black frames (fading) will be same black frames, so that no different features will possibly be acquired. That is, selected two frames will be determined to be extremely similar to each other whatever the image contents of such segments are. This problem will take place since the samples are not good central values.

For this reason, the video signal processor 10 is adapted not to extract a feature at such a fixed point but to extract a statistically central value in an entire segment. Here, the general feature sampling method will be described concerning two cases that (1) a feature can be represented as a real-number n-dimensional vector and (2) only a dissimilarity measurement criterion can be used. It should be noted that best-known visual and audio features such as histogram, power spectrum, etc. are included in the features in the case (1).

In the case (1), the number of samples is predetermined to be k and the video signal processor 10 automatically segments a feature of an entire segment into k different groups by using the well-known k-means clustering method as disclosed in "L. Kaufman and P. J. Rousseeuw: Finding Groups in Data: An Introduction to Cluster Analysis, John-Wiley and Sons, 1990". The video signal processor 10 selects, as a sample value, a group centroid or a sample approximate to the centroid from each of the k groups. The complexity of the operations in the video signal processor 10 is just the linearly increased number of samples.

On the other hand, in the case (2), the video signal processor 10 forms the k groups by the use of the k-medoids algorithm method also disclosed in "L. Kaufman and P. J. Rousseeuw: Finding Groups in Data: An Introduction to Cluster Analysis, John-Wiley and Sons, 1990". The video signal processor 10 uses, as a sample value, the above-mentioned group medoid for each of the k groups.

It should be noted that in the video signal processor 10, the method for establishing the dissimilarity measurement criterion for features representing extracted dynamic features is based on the dissimilarity measurement criterion for static features on which the former method is based, which will further be described later.

Thus, the video signal processor 10 can extract a plurality of static features to represent a dynamic feature using the plurality of static features.

As in the above, the video signal processor 10 can extract various features. However, each of such features is generally insufficient for representation, by itself, of a segment feature. For this reason, the video signal processor 10 can select a set of mutually complementary features by combining these different features. For example, the video signal processor 10 can provide more information than that of each feature by combining the above-mentioned color histogram and image correlation with each other.

Next, the measurement of similarity between segments, in which the features acquired at step S3 in FIG. 4 are used, will be described herebelow. Using the dissimilarity measurement criterion being a function to calculate a real-number value with which it is determined how dissimilar two features are to each other, the video signal processor 10 measures a dissimilarity between the segments by means of the feature similarity measurement block 17. When the dissimilarity measurement criterion is small, it indicates that two features are similar to each other. If the criterion is large, it indicates that the two features are not similar to each other. The function for calculation of the dissimilarity between the two segments $S_1$ and $S_2$ concerning the feature F is defined as dissimilarity measurement criterion $d_F(S_1, S_2)$. This function has to meet the relation given by the equations (2) below.

$$d_F(S_1, S_2)=0 \text{ (when } S_1=S_2)$$
$$d_F(S_1, S_2)\geq 0 \text{ (for all } S_1 \text{ and } S_2)$$
$$d_F(S_1, S_2)=d_F(S_2, S_1) \text{ (for all } S_1 \text{ and } S_2) \quad (2)$$

It should be noted that some of the dissimilarity measurement criteria is only applicable to specific features. However, as disclosed in "G. Ahanger and T. D. C. Little: A Survey of Technologies for Parsing and Indexing Digital Video, Journal of Visual Communication and Image Representation 7: 28–4, 1996", and "L. Kaufman and P. J. Rousseeuw: Finding Groups in Data: An Introduction to Cluster Analysis, John-Wiley and Sons, 1990", many dissimilarity measurement criteria are generally applicable to the measurement of a similarity between features represented as points in a n-dimensional space. The features include a Euclidean distance, inner product, L1 distance, etc. Since of these features, the L1 distance will effectively act on various features including the histogram, image correlation, etc., the video signal processor 10 adopts the L1 distance as a feature. On the assumption that two n-dimensional vectors are A and B, the L1 distance $d_{L1}(A, B)$ is given by the following equation (3):

$$d_{L1}(A, B) = \sum_{i=1}^{n} |A_i - B_i| \quad (3)$$

where the subscript i indicates the i-th element of each of the n-dimensional vectors A and B.

As mentioned above, the video signal processor 10 extracts, as features representing dynamic features, static features at different time points in a segment. Then, to determine a similarity between two extracted dynamic features, the video signal processor 10 uses, as a criterion for determination of a dissimilarity, a criterion for measurement of a dissimilarity between the static features on which the similarity measurement criterion is based. In many cases, the dissimilarity measurement criterion for the dynamic features should most advantageously be established using a dissimilarity between a pair of static features selected from each dynamic feature and most similar to each other. In this case, the criterion for measurement of a dissimilarity between two extracted dynamic features $SF_1$ and $SF_2$ is given by the following equation (4):

$$d_S(SF_1, SF_2) = \min_{F_1 \in SF_1, F_2 \in SF_2} d_F(F_1, F_2) \quad (4)$$

The function $d_F(F_1, F_2)$ in the equation (4) above indicates a criterion for measurement of a dissimilarity between the static features F on which the equation (4) is based. It should be noted that the a maximum or mean value of the dissimilarity between features may be taken instead of a maximum value as the case may be.

In the video signal processor 10, only one feature is insufficient to determine a similarity between segments, and so in many cases it is necessary to combine information derived from many features for the same segment. A solution for this problem is to calculate a dissimilarity based on various features as a combination of respective features as weighted. That is, when there are available k features $F_1$, $F_2, \ldots, F_k$, the video signal processor 10 uses a dissimilarity measurement criterion $d_F(S_1, S_2)$ for combined features. The criterion is given by the following equation (5):

$$d_F(S_1, S_2) = \sum_{i=1}^{k} w_i d_{Fi}(S_1, S_2) \quad (5)$$

where $\{w_i\}$ is a weighting factor of $\Sigma_i w_i = 1$.

As in the above, the video signal processor 10 can calculate a dissimilarity measurement criterion using features having been extracted at step S2 in FIG. 4 to determine a similarity between segments in consideration.

Next, the segment grouping at step S4 in FIG. 4 will be described herebelow. Using the dissimilarity measurement criterion and extracted features, the video signal processor 10 repeatedly groups similar segments lying close to each other in time, and outputs a finally produced group as a detected scene.

When detecting a scene by grouping segments, the video signal processor 10 effects two basic operations. One of the operations is to detect groups of similar segments lying close to each other in time. Most of the groups thus acquired will be a part of the same scene. The other operation effected in the video signal processor 10 is to combine concurrent segment groups together. The video signal processor 10 starts these operations with independent segments, and repeats them. Then the video signal processor 10 organizes a step-by-step larger group of segments and outputs a finally produced group as a set of scenes.

To control these operations, the video signal processor 10 is controlled under the following two constraints.

Figure 6:
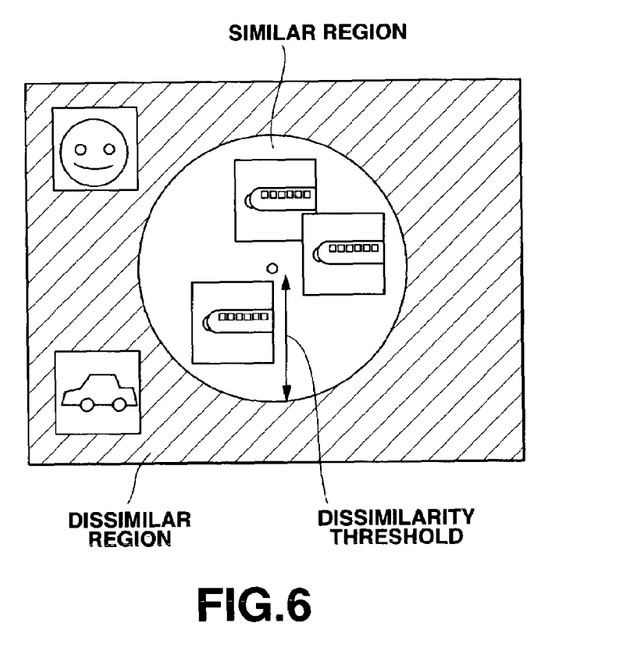
FIG. 6 explains the dissimilarity threshold.

Under one of the two constraints, the video signal processor 10 has to adopt a dissimilarity threshold $\delta_{sim}$ to determine whether two similar segments belong to the same scene. As shown in FIG. 6 for example, the video signal processor 10 judges whether one of the segments is similar or not similar to the other.

It should be noted that the video signal processor 10 may be adapted to set the dissimilarity threshold $\delta_{sim}$ by the user or automatically as will be described later.

Figure 7:
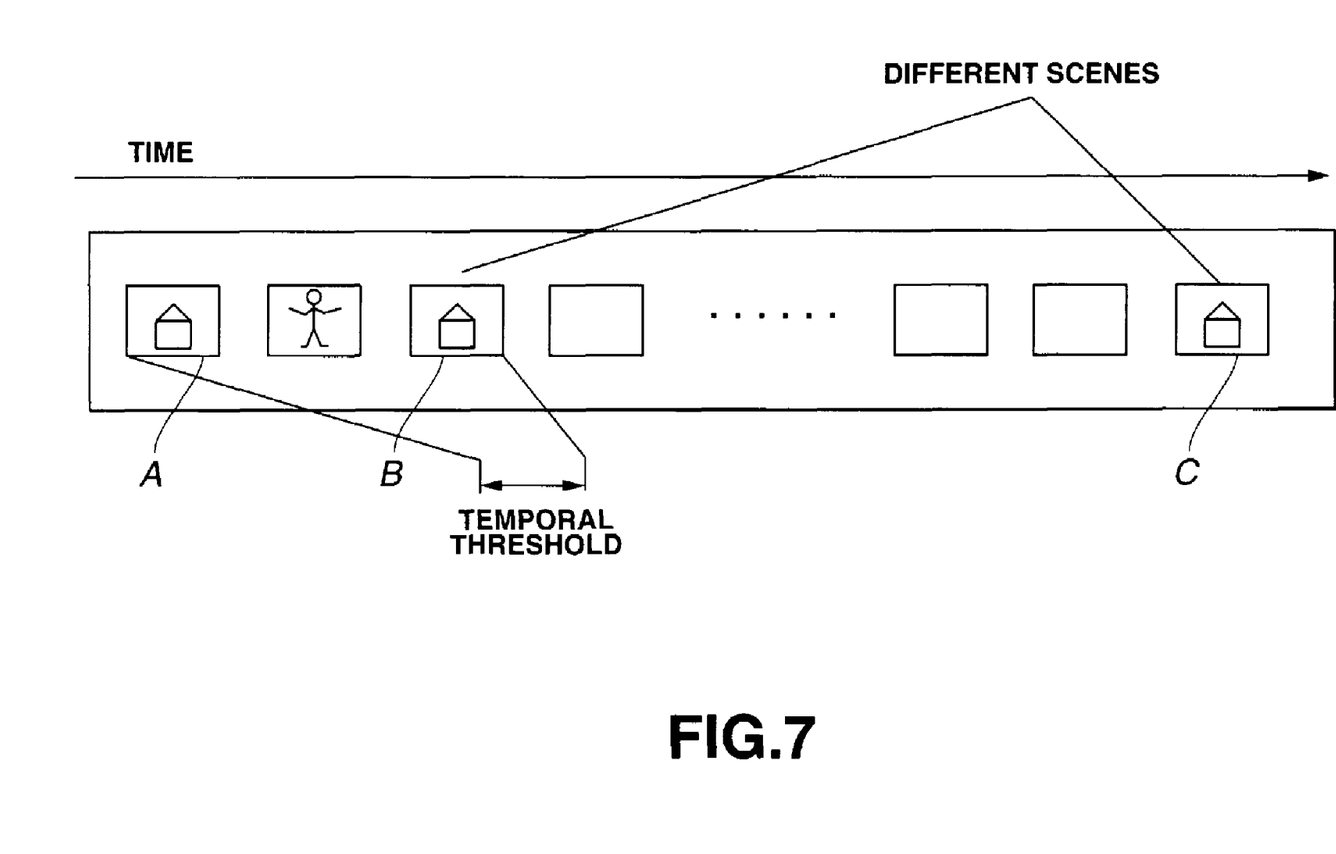
FIG. 7 explains the temporal threshold.

Under the second constraint, the video signal processor 10 has to adopt a temporal threshold T as a maximum interval between two segments on the time base, based on which the two segments can be considered to be included in the same scene. As shown in FIG. 7 for example, the video signal processor 10 puts, into the same scene, two similar segments A and B lying close to each other within the temporal threshold T but not two segments B and C similar to each other but having between them a time gap not within the temporal threshold T. Thus, because of the constraint by the temporal threshold T, the video signal processor 10 will not erroneously put into the same scene two segments similar to each other but largely apart from each other on the time base.

Since it has been found that a time for 6 to 8 shots set as the temporal threshold T would generally give a good result, the video signal processor 10 uses the temporal threshold T for 6 to 8 shots in principle.

It is assumed herein that to acquire a group of similar segments, the video signal processor 10 adopts the hierarchical clustering method disclosed in "L. Kaufman and P. J. Rousseeuw: Finding Groups in Data: An Introduction to Cluster Analysis, John-Wiley and Sons, 1990". In this algorithm, a criterion $d_c(C_1, C_2)$ for determination of a dissimilarity between two clusters $C_1$, $C_2$ is defined as a minimum similarity between elements included in each cluster. It is given by the following equation (6):

$$d_c(C_1, C_2) = \min_{S_1 \in C_1, S_2 \in C_2} dist_S(S_1, S_2) \quad (6)$$

It should be noted that in the video signal processor 10, a minimum function expressed by the equation (6) can easily be replaced with a maximum function or mean function.

Figure 8:
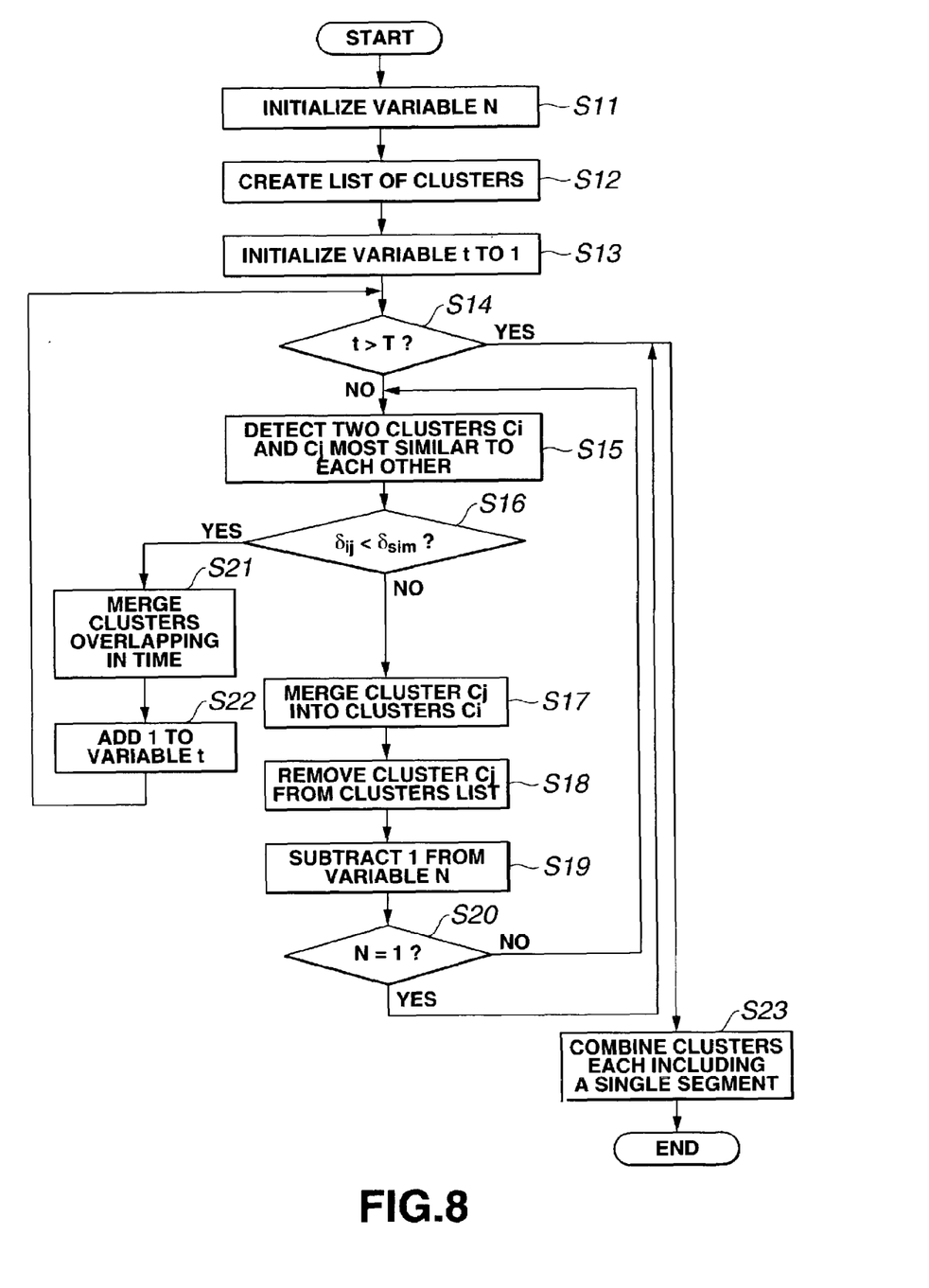
FIG. 8 is a flow chart of a series of operations effected in grouping segments in the video signal processor.

First at step S11 in FIG. 8, the video signal processor 10 initializes a variable N to the number of segments in the initial state. The variable N indicates the concurrent number of groups always detected.

Next at step S12, the video signal processor 10 generates a set of clusters. In the initial state, the video signal processor 10 takes N segments as different from each other. That is, there exist N clusters in the initial state. Each of the clusters has features indicating a start time and end time represented by $C^{start}$ and $C^{end}$, respectively. Elements included in each cluster are managed as a list in which they are arranged in order based on the start time $C^{start}$.

Next at step S13, the video signal processor 10 initializes a variable t to 1. At step S14, the video signal processor 10 judges whether the variable t is larger than the temporal threshold T. If the video signal processor 10 determines that the variable t is larger than the temporal threshold T, it will go to step S23. When it determines that the variable t is smaller than the temporal threshold T, it will go to step S15. Since the variable t is 1, however, the video signal processor 10 will go to step S15.

At step S15, the video signal processor 10 calculates the dissimilarity measurement criterion $d_c$ to detect two of the N clusters that are the most similar to each other. Since the variable t is 1, however, the video signal processor 10 will calculate the dissimilarity measurement criterion $d_c$ between adjacent clusters to detect among the adjacent clusters a pair of clusters that are the most similar to each other.

An approach to detect two clusters which are the most similar to each other may be to acquire all possible pairs of object clusters. However, since the variable t indicating a time interval between object clusters is given in segments and the clusters are arranged in the temporal order, the video signal processor 10 should calculate the dissimilarity among t clusters before and after a certain cluster.

The two clusters thus detected are defined as $C_i$ and $C_j$, respectively, and a dissimilarity between the clusters $C_i$ and $C_j$ is defined as $d_{ij}$.

At step S16, the video signal processor 10 will judge whether the dissimilarity $d_{ij}$ is larger than the dissimilarity threshold $\delta_{sim}$. When the dissimilarity $d_{ij}$ is judged larger than the dissimilarity threshold $\delta_{sim}$, the video signal processor 10 will go to step S21. If the the dissimilarity $d_{ij}$ is judged smaller than the dissimilarity threshold $\delta_{sim}$, the video signal processor 10 will go to step S17. It is assumed here that the dissimilarity $d_{ij}$ is smaller than the dissimilarity threshold $\delta_{sim}$.

At step S17, the video signal processor 10 will merge the cluster $C_j$ into the cluster $C_i$. That is, the video signal processor 10 will add to the cluster $C_i$ all the elements in the cluster $C_j$.

Next at step S18, the video signal processor 10 will remove the cluster $C_j$ from the set of clusters. It should be noted that if the start time $C_i^{start}$ changes due to the combination of the two clusters $C_i$ and $C_j$, the video signal processor 10 will rearrange the elements in the set of clusters based on the start time $C_i^{start}$.

Next at step S19, the video signal processor 10 will subtract 1 from the variable N.

At step S20, the video signal processor 10 will judge whether the variable N is 1 or not. If the variable N is judged to be 1, the video signal processor 10 will go to step S23. When the video signal processor 10 determines that the variable N is not 1, it will go to step S15. It is assumed here that the variable N is not 1.

Thus, at step S15, the video signal processor 10 will calculate the dissimilarity measurement criterion $d_c$ again to detect two clusters the most similar to each other. Since the variable t is 1, the video signal processor 10 will calculate the criterion $d_c$ for determination of the dissimilarity between adjacent clusters to detect a pair of clusters that are the most similar to each other.

Next at step S16, the video signal processor 10 will judge whether the dissimilarity $d_{ij}$ is larger than the dissimilarity threshold $\delta_{sim}$. It is also assumed here that the dissimilarity $d_{ij}$ is smaller than the dissimilarity threshold $\delta_{sim}$.

The video signal processor 10 will effect the operations at steps S17 to S20.

When as a result of the repetition of the above operations and subtraction of 1 from the variable N, it is determined at step S20 that the variable N is 1, the video signal processor 10 will go to step S23 where it will combine together clusters each including a single segment. Finally, the video signal processor 10 terminates the series of operations by grouping all segments into one cluster as in the above.

If the video signal processor 10 determines at step S16 that the dissimilarity $d_{ij}$ is larger than the dissimilarity threshold $\delta_{sim}$, it will go to step S21 where it will repeatedly combine clusters which concurrently exist. Namely, if the time interval between $C_i^{start}$ and $C_i^{end}$ of the cluster $C_i$ is concurrent with that between $C_j^{start}$ and $C_j^{end}$ of the cluster $C_j$, the two clusters $C_i$ and $C_j$ overlap each other on the time base. Thus, the video signal processor 10 can arrange the clusters in a set based on the start time $C_i^{start}$ of the cluster set to detect concurrent clusters and combine the clusters together.

At step S22, the video signal processor 10 will add 1 to the variable t which will thus be t=2, and go to step S14 where it will judge whether the variable t is larger than the temporal threshold T. It is also assumed here that the variable t is smaller than the temporal threshold T and the video signal processor 10 will go to step S15.

At step S15, the video signal processor 10 will calculate the dissimilarity measurement criterion $d_c$ and detects two of a plurality of clusters existing currently, that are the most similar to each other. However, since the variable t is 2, the video signal processor 10 calculates the criterion $d_c$ for determination of the dissimilarity between adjacent clusters as well as between every other clusters to detect a pair of clusters the most similar to each other.

Then at step S16, the video signal processor 10 judges whether the dissimilarity $d_{ij}$ between adjacent clusters and every other clusters $C_i$ and $C_j$ is larger than the dissimilarity threshold $\delta_{sim}$. It is assumed here that the dissimilarity $d_{ij}$ is smaller than the dissimilarity threshold $\delta_{sim}$. After effecting the operations at steps S21 and S22, the video signal processor 10 adds 1 to the variable t which will thus be t=3, and will move to step S14 and subsequent steps. When the variable t is 3, the video signal processor 10 will calculate, at step S15, the criterion $d_c$ for determination of the dissimilarity between clusters existent down to every two clusters, and detect a pair of clusters which are the most similar to each other.

When as a result of the repetition of the above operations and addition of 1 to the variable t, it is determined at step S14 that the variable t is larger than the tine threshold T, the video signal processor 10 will go to step S23 where it will combine clusters each including a single segment. That is, the video signal processor 10 will take discrete clusters as ones each including a single segment. If there exist a sequence of such clusters, the video signal processor 10 will combine them together. This process combines together segments having no relation in similarity with any adjacent scene. However, it should be noted that the video signal processor 10 has not to always effect this process.

With this series of operations, the video signal processor 10 can gather the plurality of clusters and generate a scene to be detected.

It should be noted that the video signal processor 10 may be adapted to set the dissimilarity threshold $\delta_{sim}$ by the user or automatically determine it as having previously been described. However, when a fixed value is used as the dissimilarity threshold $\delta_{sim}$, the optimum value of the dissimilarity threshold $\delta_{sim}$ will depend upon the content of a video data. For example, for a video data whose content is variable, the dissimilarity threshold δsim has to be set to a high value. On the other hand, for a video data having a less-variable content, the dissimilarity threshold $\delta_{sim}$ has to be set to a low value. Generally, when the dissimilarity threshold $\delta_{sim}$ is high, less scenes will be detected. On the other hand, when dissimilarity threshold $\delta_{sim}$ is low, more scenes will be detected.

Thus, an optimum dissimilarity threshold $\delta_{sim}$ has to be determined since the performance of the video signal processor 10 depends greatly upon the dissimilarity threshold $\delta_{sim}$. Therefore, when the video signal processor 10 is adapted to set a dissimilarity threshold $\delta_{sim}$ by the user, the above has to be taken in consideration. On the other hand, the video signal processor 10 may be adapted to automatically set an effective dissimilarity threshold $\delta_{sim}$ by using any of methods which will be described below.

One of the methods will be described by way of example. Namely, the video signal processor 10 can acquire a dissimilarity threshold $\delta_{sim}$ by using a statistic quantity such as mean value and median in distribution of the dissimilarity between $(n)(n-1)/2$ segment pairs. Assume here that the mean value and standard deviation of the dissimilarity between all segment pairs is $\mu$ and $\sigma$, respectively. In this case, the dissimilarity threshold $\delta_{sim}$ can be represented by a form of $a\mu+b\sigma$ where a and b are constants. It has been found that setting of the constants a and b to 0.5 and 0.1, respectively, will assure a good result.

The video signal processor 10 has not to determine any dissimilarity between all pairs of segments but should measure a dissimilarity by selecting at random from a set of all segment pairs a sufficient number of segment pairs to provide nearly real mean value $\mu$ and standard deviation $\sigma$. Using the mean value $\mu$ and standard deviation $\sigma$ thus determined, the video signal processor 10 can automatically determine an appropriate dissimilarity threshold $\delta_{sim}$.

In the foregoing, the use of a single dissimilarity measurement criterion in the video signal processor 10 has been described. In addition, the video signal processor 10 can a weighting function to combine a variety of dissimilarity measurement criteria for different types of features in order to judge whether segments in pairs belong to the same group, as having previously been described. The features can only be weighted after trial and error, and when the features are different in type from each other, it is usually difficult to appropriately weight them. However, using a color histogram and texture feature, for example, in combination, the video signal processor 10 can detect possible scenes for these features and synthesize a single scene structure from the structures of the detected scenes, thereby permitting to detect a scene in which both the color histogram and texture feature are included. Each of the results of scene detection for the features will be referred to as "scene layer" hereinafter. For example, when a color histogram and segment length are used as features, the video signal processor 10 can detect scenes which are based on the features, respectively, to provide a scene layer for the color histogram and a one for the segment length. The video signal processor 10 can combine these scene layers into a single scene structure.

Generally, information from video and audio domains cannot be combined in principle. Using a similar method to that for combining structures based on features different in quality from each other, the video signal processor 10 can combine into a single scene structure scene layers obtainable based on information from video and audio domains.

Such an algorithm will be described herebelow. It is assumed here that there are k features $F_1, F_2, \ldots, F_k$ each representing one similarity criterion and there are available a dissimilarity measurement criterion $d_F^i$, dissimilarity threshold $\delta^i_{sim}$ and a temporal threshold $T^i$ correspondingly to the features $F_i$. Using the dissimilarity measurement criterion $d_F^i$, dissimilarity threshold $\delta^i_{sim}$ and a temporal threshold $T^i$ for the features $F_i$, the video signal processor 10 detects a set of scene layers $X_i = \{X_i^j\}$. For example, the video signal processor 10 detects divisional scene layers for video and audio information, respectively, and generates two independent scene layers $X_i = \{X_i^j\}$ (i=1, 2) for the video and audio information, respectively.

The video signal processor 10 has to determine how to combine scene boundaries for combination of difference scene layers into a single scene structure. The scene boundaries do not always match one another. It is assumed here that for the scene layers, boundary points represented by a sequence of times indicating the scene boundaries are $t_{i1}, t_{i2}, \ldots, t_i|x_i|$. The video signal processor 10 first selects a certain scene layer to be a basis for alignment of the boundary points in order to combine various scene layers into a single group. Then, the video signal processor 10 determines for each of the boundary points $t_{i1}, t_{i2} \ldots, t_i|x_i|$ whether other scene layers are those in the scene structure produced by finally combining the scene layers.

It is assumed here that the logical function indicating whether the i-th scene layer $X_i$ has a boundary point near a time t is $B_i(t)$. The term "near" varies depending upon the situation of the scene layer $X_i$, and it is for example 0.5 sec for combining scene layers based on video and audio information, respectively.

The video signal processor 10 calculates the logical function $B_i(t_j)$ for each of the boundary points $t_j = t_{ij}$ when $j=1, \ldots, |X_i|$ and $i=1, \ldots, k$. The calculation result will indicate whether the boundary point exists near the time $t_j$ for each of the scene layers. The video signal processor 10 uses $B_i(t_j)$ as a decision function when determining whether in the combined scene structure, the time $t_j$ is a scene boundary.

A simple example of the decision function is to count real $B_i(t_j)$ and regard the time $t_j$ as the scene boundary of the combined scene structure. Especially when m=1, it means that the boundary points of all the scene layers are the boundary points of the final scene structure. On the other hand, when m=k, it means that a scene boundary regarded as common to all the scene layers is the boundary point of the combined scene structure.

Thus, the video signal processor 10 can combine difference scene layers into a single scene structure.

As having been described in the foregoing, the video signal processor 10 according to the present invention is to extract a scene structure. It has already been proved by many experiments that the signal processing method carried out by the video signal processor 10 can be used to extract a scene structure from video data having various contents such as TV dramas, movies, etc.

The video signal processor 10 is full automatic and can automatically determine an appropriate threshold correspondingly to a change in content of a video data without the necessity of any user's intervention to set the aforementioned dissimilarity threshold and temporal threshold.

Further, the video signal processor 10 according to the present invention can be operated by the user without any prior knowledge of a semantics of a video data.

Moreover, since the video signal processor 10 is very simple and can efficiently calculate, so it can be applied in home electronic appliances such as a set-top box, digital video recorder, home server, etc.

Also the video signal processor 10 can provide a result of scene detection as a basis for a new high-level access for the video browsing. Therefore, the video signal processor 10 permits an easy access to a video data, which is based on the content of the data, by visualizing the content of the video data using the high-level scene video structure, not any segments. For example, the video signal processor 10 displays a scene by which the user can quickly know the summary of a program and thus quickly find a part of the program in which he is interested.

Furthermore, the video signal processor 10 can provide a result of scene detection as a basis for automatic outlining or summarizing of a video data. For a consistent summing-up, it is generally necessary to decompose a video data into reconstructible meaningful components, not to combine together random fragments of a vide data. A scene detected by the video signal processor 10 serves as a basis for preparation of such a summary.

It should be noted that the present invention is not limited to the embodiment having been described in the foregoing, but the features used for measurement of similarity between segments example may of course be other than those having been described and be appropriately modified without departing from the scope of the present invention defined later.

INDUSTRIAL APPLICABILITY

As having been described in detail in the foregoing, the present invention provides the signal processing method for detecting and analyzing a pattern reflecting the semantics of the content of a signal, the method including steps of extracting, from a segment consisting of a sequence of consecutive frames forming together the signal, at least one feature which characterizes the properties of the segment; calculating, using the extracted feature, a criterion for measurement of a similarity between a pair of segments for every extracted feature and measuring a similarity between a pair of segments according to the similarity measurement criterion; and detecting, according to the feature and similarity measurement criterion, two of the segments, whose mutual time gap is within a predetermined temporal threshold and mutual dissimilarity is less than a predetermined dissimilarity threshold, and grouping the segments into a scene consisting of a sequence of temporally consecutive segments reflecting the semantics of the signal content.

Therefore, the signal processing method according to the present invention can detect similar segments in a signal and group them into a scene, thereby permitting to extract a higher-level structure than a segment.

Also the present invention provides the video signal processor for detecting and analyzing a visual and/or audio pattern reflecting the semantics of the content of a supplied video signal, the apparatus including means for extracting, from a visual and/or audio segment consisting of a sequence of consecutive visual and/or audio frames forming together the video signal, at least one feature which characterizes the properties of the visual and/or audio segment; means for calculating, using the extracted feature, a criterion for measurement of a similarity between a pair of visual segments and/or audio segments for every extracted feature and measuring a similarity between a pair of visual segments and/or audio segments according to the similarity measurement criterion; and means for detecting, according to the feature and similarity measurement criterion, two of the visual segments and/or audio segments, whose mutual time gap is within a predetermined temporal threshold and mutual dissimilarity is less than a predetermined dissimilarity threshold, and grouping the visual segments and/or audio segments into a scene consisting of a sequence of temporally consecutive visual segments and/or audio segments reflecting the semantics of the video signal content.

Therefore, the video signal processor according to the present invention can detect similar visual segments and/or audio segments in the video signal and group them for output as a scene, thereby permitting to extract a higher-level video structure than a visual and/or audio segment.

What is claimed is:

1. A signal processing method for detecting and analyzing a pattern reflecting the semantics of the content of a signal, the method comprising steps of:
   extracting, from a segment consisting of a sequence of consecutive frames forming together the signal, at least one feature which characterizes the properties of the segment;
   calculating, using the extracted feature, a criterion for measurement of a similarity between a the pair of segments for every extracted feature and measuring a similarity between the pair of segments according to the similarity measurement criterion; and
   detecting, according to the feature and similarity measurement criterion, two of the segments, whose mutual time gap is within a predetermined temporal threshold and mutual dissimilarity is less than a predetermined dissimilarity threshold, and grouping the segments into a scene consisting of a sequence of temporally consecutive segments reflecting the semantics of the signal content.

2. The method as set forth in claim 1, wherein the signal is at least one of visual and audio signals included in a video data.

3. The method as set forth in claim 1, wherein at the feature extracting step, a single statistic central value of the plurality of features at different time points in a single segment is selected for extraction.

4. The method as set forth in claim 1, wherein a statistic value of the similarity between a plurality of segment pairs is used to determine the dissimilarity threshold.

5. The method as set forth in claim 1, wherein of the segments, more than at least one segment which could not have been grouped into a scene at the grouping step are grouped into a single scene.

6. The method as set forth in claim 1, wherein a result of scene detection from arbitrary features acquired at the grouping step and more than at least one result of scene detection for features different from the arbitrary ones, are combined together.

7. The method as set forth in claim 2, wherein more than at least one result of scene detection from the video signal acquired at the grouping step and more than at least one result of scene detection from the audio signal acquired at the grouping step, are combined together.

8. A video signal processor apparatus for detecting and analyzing a visual and/or audio pattern reflecting the semantics of the content of a supplied video signal, the apparatus comprising:
   means for extracting, from a visual and/or audio segment consisting of a sequence of consecutive visual and/or audio frames forming together the video signal, at least one feature which characterizes the properties of the visual and/or audio segment;
   means for calculating, using the extracted feature, a criterion for measurement of a similarity between a pair of visual segments and/or audio segments for every extracted feature and measuring a similarity between the pair of visual segments and/or audio segments according to the similarity measurement criterion; and
   means for detecting, according to the feature and similarity measurement criterion, two of the visual segments and/or audio segments, whose mutual time gap is within a predetermined temporal threshold and mutual dissimilarity is less than a predetermined dissimilarity threshold, and grouping the visual segments and/or audio segments into a scene consisting of a sequence of temporally consecutive visual segments and/or audio segments reflecting the semantics of the video signal content.

9. The apparatus as set forth in claim 8, wherein the feature extracting means selects, for extraction, a single statistic central value of the plurality of features at different time points in a single visual and/or audio segment.

10. The apparatus as set forth in claim 8, wherein a statistic value of the similarity between a plurality of visual and/or audio segment pairs is used to determine the dissimilarity threshold.

11. The apparatus as set forth in claim 8, wherein of the visual and/or audio segments, more than at least one visual and/or audio segment which could not have been grouped into a scene by the grouping means are grouped into a single scene.

12. The apparatus as set forth in claim 8, wherein a result of scene detection for arbitrary features acquired by the grouping means and more than at least one result of scene detection for features different from the arbitrary ones, are combined together.

13. The apparatus as set forth in claim 8, wherein more than at least one result of scene detection from the visual signal of the video signal acquired by the grouping means and more than at least one result of scene detection from the audio signal of the video signal acquired by the grouping means, are combined together.

* * * * *